United States Patent [19]
Firestone

[11] Patent Number: 6,059,292
[45] Date of Patent: May 9, 2000

[54] SPEED REDUCER APPARATUS HAVING AUXILIARY SEAL ASSEMBLY

[75] Inventor: Charles R. Firestone, Elizabethton, Tenn.

[73] Assignee: Reliance Electric Industrial Company, Milwaukee, Wis.

[21] Appl. No.: 08/853,502

[22] Filed: May 8, 1997

[51] Int. Cl.[7] ....................................... F16J 15/44
[52] U.S. Cl. .......................... 277/301; 277/411; 277/421; 277/944
[58] Field of Search .................................. 277/301, 411, 277/412, 421, 944, 404, 321

[56] References Cited

U.S. PATENT DOCUMENTS

| | | |
|---|---|---|
| 3,590,652 | 7/1971 | Strang . |
| 4,277,072 | 7/1981 | Forch ...................................... 277/404 |
| 4,452,547 | 6/1984 | Thiel . |
| 4,626,114 | 12/1986 | Phillips . |
| 4,915,594 | 4/1990 | Lammers ................................ 417/603 |
| 5,540,448 | 7/1996 | Heinzen .................................. 277/321 |

OTHER PUBLICATIONS

A brochure entitled "Torque–Arm™ Speed Reducers" by Dodge, 6040 Ponders Court, Greenville, SC 29602, dated 1994.
A brochure entitled "Dodge® Maxum® Concentric Speed Reducers" by Dodge, 6040 Ponders Court, Greenville, SC 29602, dated 1995.

*Primary Examiner*—Lynne H. Browne
*Assistant Examiner*—David E. Bochna
*Attorney, Agent, or Firm*—Craig N. Killen; John J. Horn; Alex M. Gerasimow

[57] ABSTRACT

A speed reducer apparatus includes an auxiliary seal assembly to inhibit ingress of particulate matter. Preferably, the seal assembly is located axially outboard of a primary seal, such as a land riding seal. The seal assembly includes a plate defining a hole through which a rotatable member extends. The hole is sized to provide a predetermined gap between the inside surface of the plate and the outside surface of the rotatable member. An annular bead member is set in place from a viscous state about the rotatable member. In particular, the annular bead member extends across the gap between the plate and the rotatable member, functioning as a dam. Methods of forming the auxiliary seal assembly are also disclosed.

25 Claims, 4 Drawing Sheets

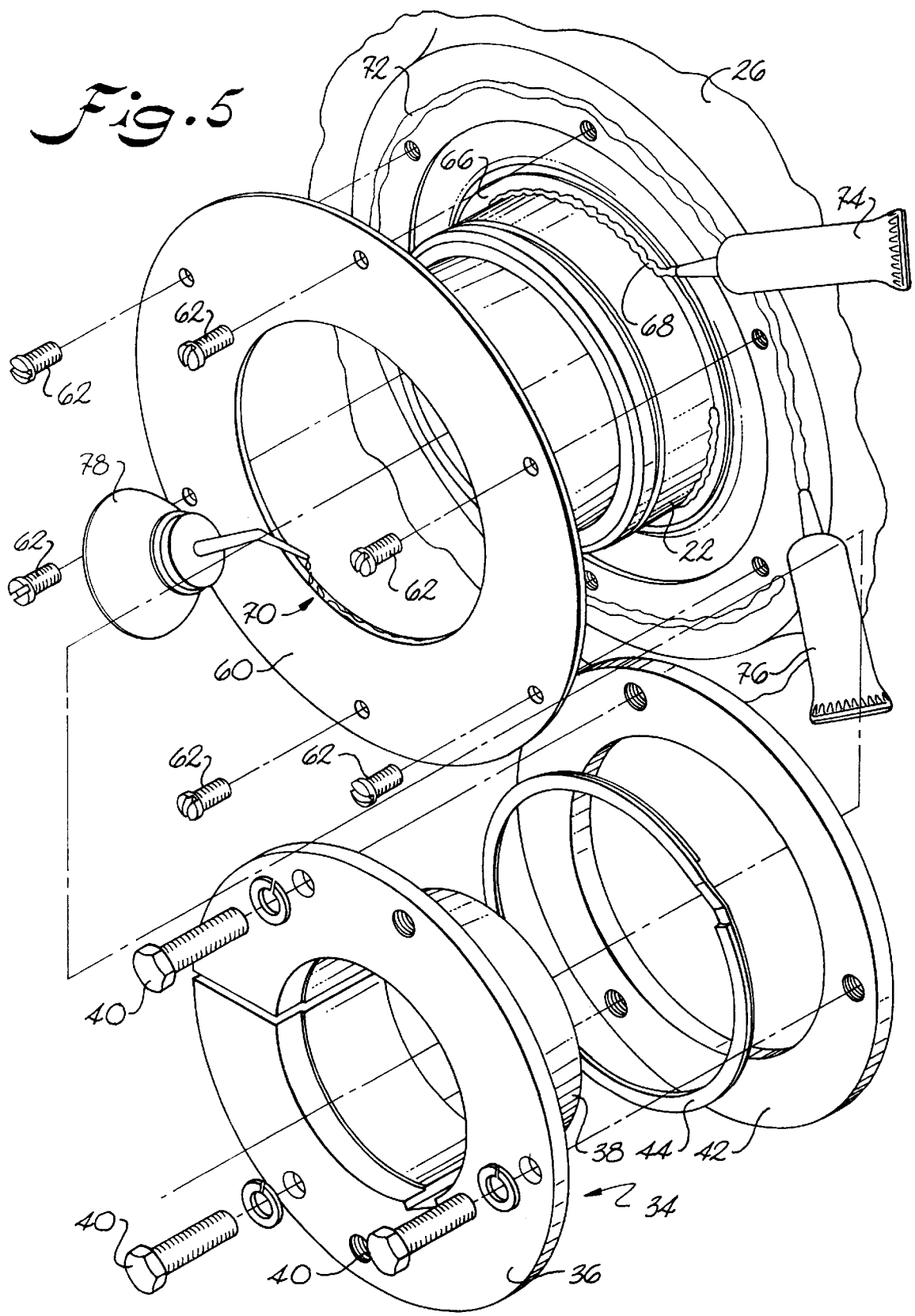

SPEED REDUCER APPARATUS HAVING AUXILIARY SEAL ASSEMBLY

BACKGROUND OF THE INVENTION

The present invention relates generally to the art of speed reducers of the type for supplying rotational energy from a prime mover to a driven element. More particularly, the present invention relates to a speed reducer which includes an improved auxiliary seal assembly.

Speed reducers and other such mechanical components are often utilized in demanding environments. For example, speed reducers are frequently connected to the drive pulley of conveyors used in industrial, agricultural or mining applications. In such applications, the speed reducer will often be exposed to relatively large amounts of particulate matter. Occasionally, this particulate matter can work its way into the interior housing of the speed reducer, giving rise to various maintenance concerns.

Specifically, the particulate matter may enter the housing of the speed reducer around the various rotatable members by which the speed reducer is connected to other equipment. For example, many speed reducers are provided with rotatable shafts extending from the housing. Some speed reducers include rotatable hubs for connection to driven shafts. While various seals, such as land riding seals, may be utilized to isolate the housing interior from the ambient environment, ingress of particulate matter is not entirely eliminated.

In the past, speed reducers having output hubs were often provided with hub covers to provide auxiliary sealing. These covers, attached to the speed reducer housing, are dimensioned to enclose the various mounting hardware utilized to connect the driven shaft to the output hub. As a result, such covers contribute to an overall increase in the size of the speed reducer, making their use impractical in some applications.

SUMMARY OF THE INVENTION

The present invention recognizes and addresses the foregoing disadvantages, and others, of prior art constructions and methods. Accordingly, it is an object of the present invention to provide a speed reducer having an improved seal assembly.

It is a more particular object of the present invention to provide a speed reducer utilizing an improved auxiliary seal assembly for inhibiting ingress of particulate matter.

It is a more particular object of the present invention to provide improved auxiliary seal assembly for a rotatable member that can be utilized in limited space.

It is also an object of the present invention to provide a mechanical apparatus including a novel seal assembly.

It is also an object of the present invention to provide a novel method of providing a seal about a rotatable member that is formed and cured in place.

Some of these objects are achieved by a speed reducer apparatus comprising a housing and an input shaft extending from the housing for connection to a source of power. An output member having a generally cylindrical outer surface is also provided. The output member is rotatably driven by rotation of the input shaft. In some exemplary embodiments, the output member may comprise a hub defining an axial bore therethrough.

The speed reducer further includes a seal assembly having a plate defining a hole through which the output member extends. The hole defines a first gap between an inner surface of the plate and the outer surface of the output member. Preferably, the plate may be attached to the housing in a manner to be physically separable therefrom.

The seal assembly further includes an annular bead member of polymeric sealant material about the output member. The bead member extends across the first gap while permitting relative rotation between the plate and the output member. The polymeric sealant material may comprise a silicone sealant compound.

In some exemplary embodiments, the output member defines a stepped portion having a first side surface opposing a second side surface of the plate to define a second gap therebetween. In this case, the annular bead member preferably also extends into the second gap.

The annular bead member is preferably fixed with respect to one of the plate and the output member. For example, the annular bead member may be fixed with respect to the output member. In this case, the plate will be rotatable with respect to the annular bead member.

In some exemplary embodiments, a primary seal, such as a land riding seal, may be located axially internal of the seal structure.

Other objects of the invention are achieved by a mechanical apparatus comprising a bearing assembly having first and second race members capable of relative rotation. The apparatus further comprises a structure supporting the bearing assembly. The first race member of the bearing assembly is fixed with respect to the structure. In addition, the apparatus includes an axial member supported by the bearing assembly and rotatable with the second race member. The axial member has a generally cylindrical outer surface. For example, the axial member may comprise a hub defining an axial bore therethrough.

The mechanical apparatus further comprises a plate connected to the structure and defining a hole through which the axial member extends. The hole defines a first gap between an inner surface of the plate and the outer surface of the axial member. An annular bead member of polymeric sealant material is set in place from a viscous state about the axial member. The bead member extends across the first gap while permitting relative rotation between the plate and the axial member.

Preferably, the annular bead member is fixed with respect to one of the plate and the axial member. For example, the annular bead member may be fixed with respect to the axial member, with the plate being rotatable with respect to the annular bead member.

In some exemplary embodiments, the axial member may define a stepped portion having a first side surface opposing a second side surface of the plate, thereby defining a second gap. In this case, the annular bead member further extends into the second gap.

The mechanical apparatus may further comprise a primary seal, such as a land riding seal, located axially adjacent to the plate.

In some exemplary embodiments, the plate is attached to the structure in a manner to be physically separable therefrom. For example, the plate may be attached to the structure by screws. A polymeric gasket may be located between the structure and the plate.

Further objects of the invention are achieved by a method of providing a seal about a rotatable member being supported from a housing structure. One step of the method involves providing an element defining therein a hole having a selected inner diameter greater than an outer diameter of the rotatable member. Additionally, the housing structure is provided such that the element can be separably mounted thereon with the hole about the rotatable member to define a gap therebetween.

An annular bead of polymeric sealant material is applied in a viscous state to one of the element and the rotatable member when the element is separated from the housing structure. A release agent is also applied to another of the element and the rotatable member when the element is separated from the housing structure. Next, the element is mounted to the housing structure before the polymeric sealant material sets from the viscous state such that the polymeric sealant material extends across the gap. The polymeric sealant material is then allowed to set, thereby forming an annular bead member.

According to particular methodology, the polymeric sealant material is applied in the viscous state to the rotatable member. The polymeric sealant material may comprise a silicone sealant compound, whereas the release agent may comprise a lubricating oil.

In some cases, the rotatable member may comprise a hub defining an axial bore therethrough. Such a hub may define a stepped portion on an outer surface thereof located to be axially adjacent to the element when the element is mounted to the housing structure. In this case, the polymeric sealant material may be applied in the viscous state to the rotatable member by being applied into a corner defined by the stepped portion.

Still further objects of the invention are achieved by an apparatus comprising a rotatable member having a predetermined first diameter at an outer surface thereof. A blocking element is mounted about the rotatable member. The blocking element defines therein a hole having a predetermined second diameter at an inner surface thereof greater than the first diameter. An annular bead member is attached to the rotatable element and extends across a gap between the outer surface thereof and the inner surface of the blocking element The annular bead member allows relative rotation between the blocking member and the rotatable element. In addition, the annular bead member conforms to the outer surface of the rotatable member despite irregularities in the outer surface.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 5 is an assembly view illustrating one manner in which a seal assembly of the present invention may be made.

Figure 1:
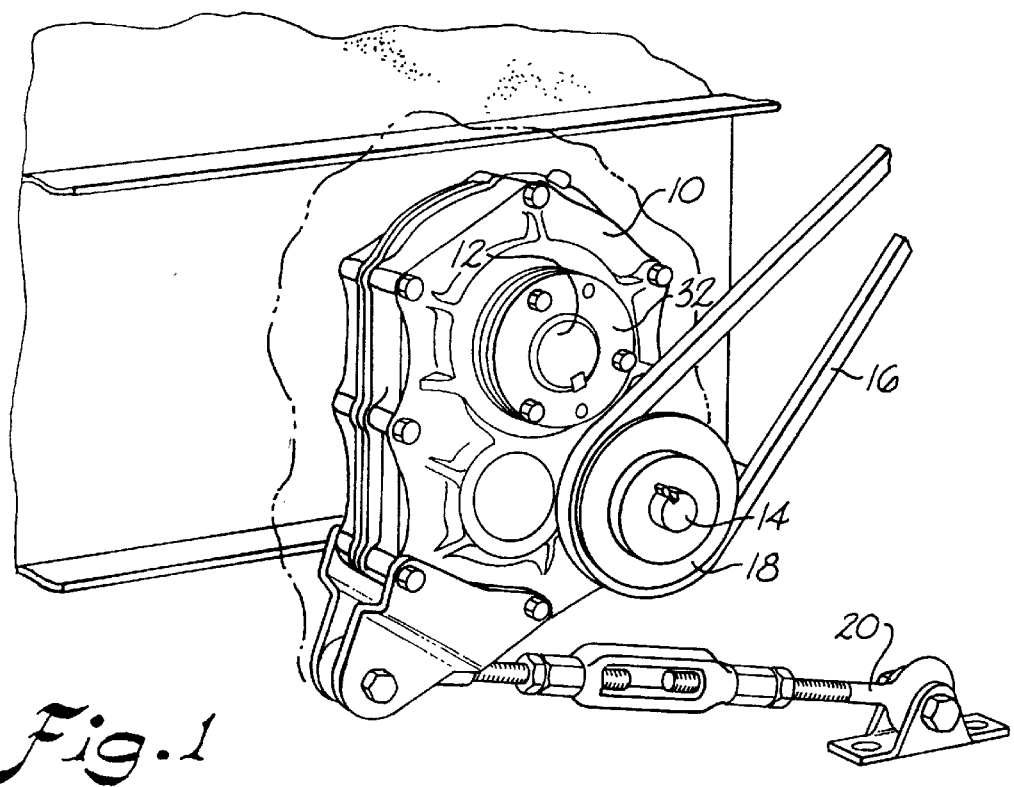
FIG. 1 is a perspective view illustrating a speed reducer apparatus driving a pulley shaft of a conveyor system.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIG. 1, a shaft-carried speed reducer 10 is illustrated in a typical application in which such devices are utilized. As is well known, speed reducers function generally to reduce the rotational speed of mechanical power received from a power source. Such reduction in rotational speed causes a concomitant increase in torque delivered to the load, as desired. In this case, speed reducer 10 is shown driving a shaft 12 extending from a drive pulley of a conveyor apparatus.

Speed reducer 10 includes an input shaft 14 driven by a prime mover, such as an electric motor. The prime mover is connected to input shaft 14 through a V-belt 16 extending around sheave 18. A torque arm member 20 is provided to resist torque which would tend to rotate speed reducer 10 about shaft 12.

It is contemplated that speed reducer 10 may often be utilized in applications resulting in exposure to relatively large amounts of particulate matter. For example, when used in a rice processing facility, speed reducer 10 may be completely submerged in rice chaff. Without appropriate auxiliary sealing, much of this chaff may enter the interior of speed reducer 10. The presence of chaff or other contaminate inside the reducer housing could give rise to increased maintenance and various other problems. As will be described in more detail below, however, speed reducer 10 has been adapted to substantially eliminate ingress of such particulate matter.

Figure 2:
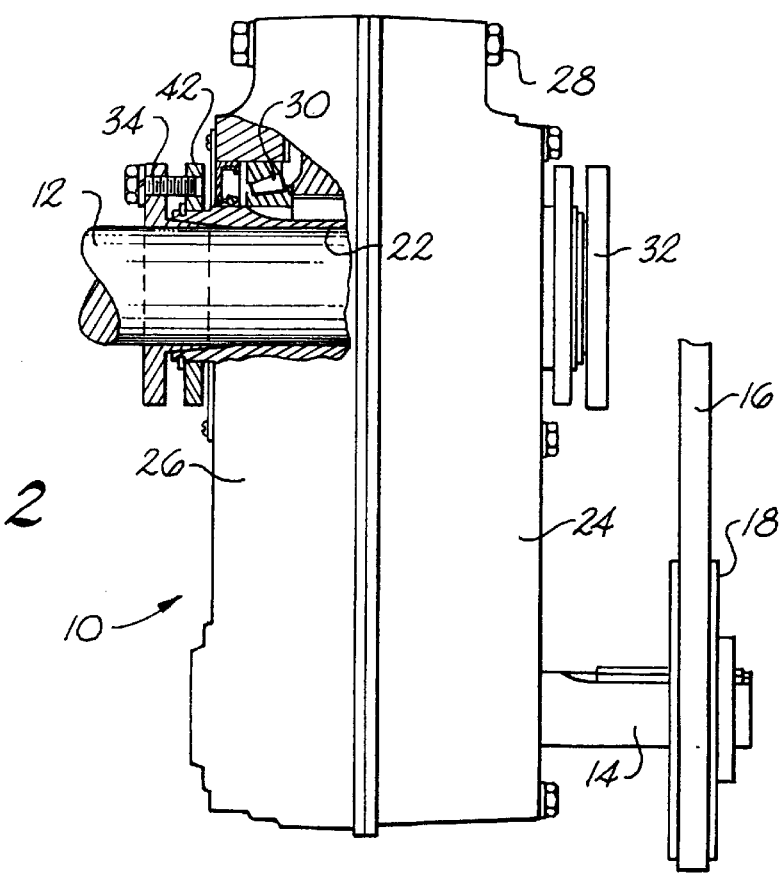
FIG. 2 is a side elevational view of a speed reducer apparatus partially cut away to illustrate a seal assembly constructed in accordance with the present invention.

As can be seen in FIG. 2, shaft 12 is secured to output hub 22 of speed reducer 10. Output hub 22 carries an output gear which is driven from input shaft 14 by an appropriate gear train within the reducer housing. As shown, the housing may be constructed having a front portion 24 and a back portion 26 mated together utilizing bolts, such as bolt 28. Hub 22 is rotatably supported in the reducer housing by suitable bearing assemblies, such as bearing assembly 30.

Figure 3:
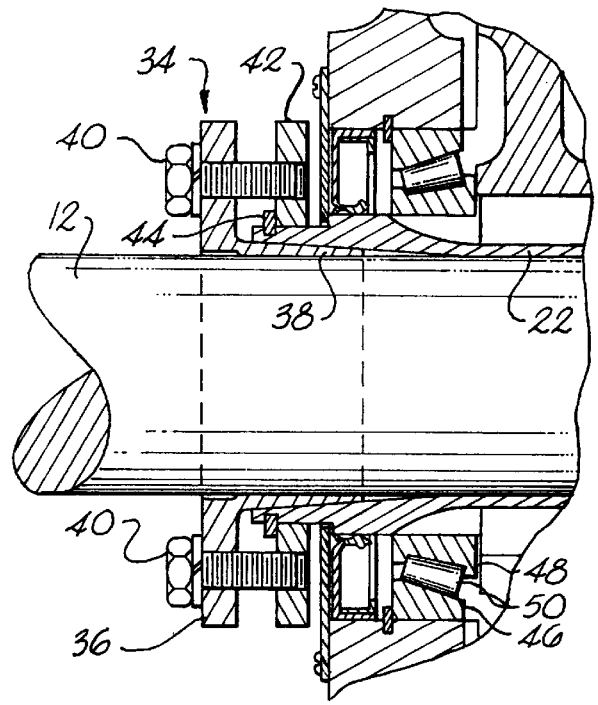
FIG. 3 is an enlarged partial cross-sectional view of the speed reducer apparatus of FIG. 2 illustrating the seal assembly in greater detail.

In this case, output hub 22 is secured to shaft 12 utilizing a pair of opposed bushings 32 and 34. Referring now to FIG. 3, the operation of bushing 34 will be described. It will be appreciated, however, that bushing 32 will function in a similar manner. Further details of this type of securement arrangement can be found in U.S. Pat. No. 3,590,652 to Strang, incorporated herein by reference.

Bushing 34 includes a flange portion 36 integrally extending into a sleeve portion 38. Sleeve portion 38 has a tapered outer surface engaging a tapered inner surface defined in output hub 22. A plurality of threaded members 40 extend through flange portion 36 into threaded holes defined in a backing ring 42. Backing ring 42 is maintained in position by a snap ring 44 situated in a suitable groove defined in the outer surface of output hub 22.

As threaded members 40 are tightened, sleeve portion 38 is drawn farther into output hub 22. Sleeve portion 38 includes at least one axial slot which permits it to contract tightly about shaft 12. As a result, shaft 12 and output hub 22 will be secured together for mutual rotation.

Figure 4:
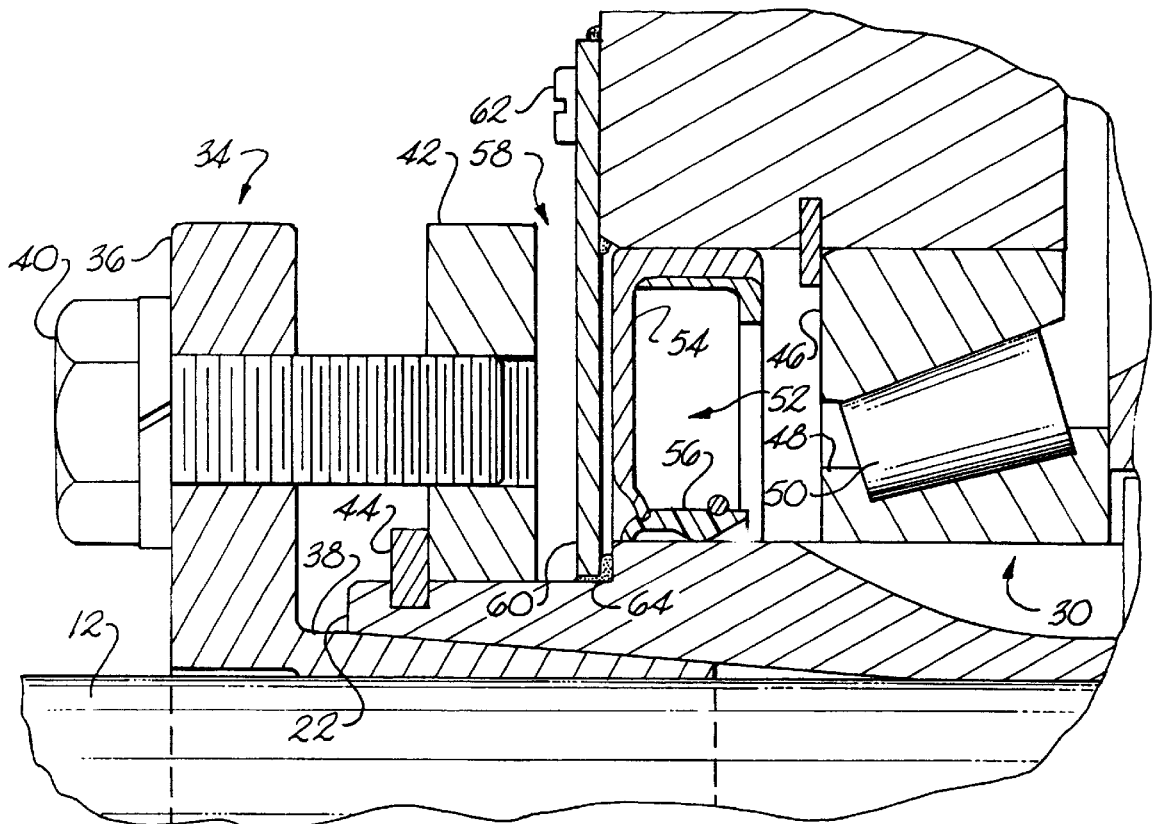
FIG. 4 is a partial cross-sectional view further enlarged to illustrate the seal assembly.

Referring now to FIG. 4, bearing assembly 30 includes an outer race member 46 fixed with respect to the reducer housing. An opposed inner race member 48 rotates with output hub 22. A plurality of bearing elements are situated in the space between outer race member 46 and inner race member 48 to facilitate relative rotation. While tapered roller bearing elements such as bearing element 50 are illustrated, it should be appreciated that other suitable bearing configurations, such as ball bearings, may also be utilized for this purpose.

The seal arrangement of speed reducer 10 will now be explained. As is typical in the prior art, speed reducer 10 includes a primary seal 52 located between bearing assembly 30 and the ambient environment. Primary seal 52 includes a seal carrier 54 fixed with respect to the housing of speed reducer 10. An annular seal member 56 is maintained by seal carrier 54 against the outer surface of hub 22. Seal member 56 is thus a land riding seal contacting the outer surface of hub 22, but remaining stationary as the hub rotates. Typically, seal member 56 will be constructed of a suitable resilient material, such as various polymeric materials known for this purpose.

Speed reducer 10 further includes an auxiliary seal assembly 58 located axially outboard of primary seal 52. Seal assembly 58 includes an annular plate 60 defining a hole through which hub 22 extends. Preferably, plate 60 is separably attached to the reducer housing, such as utilizing screws 62.

Figure 4A:
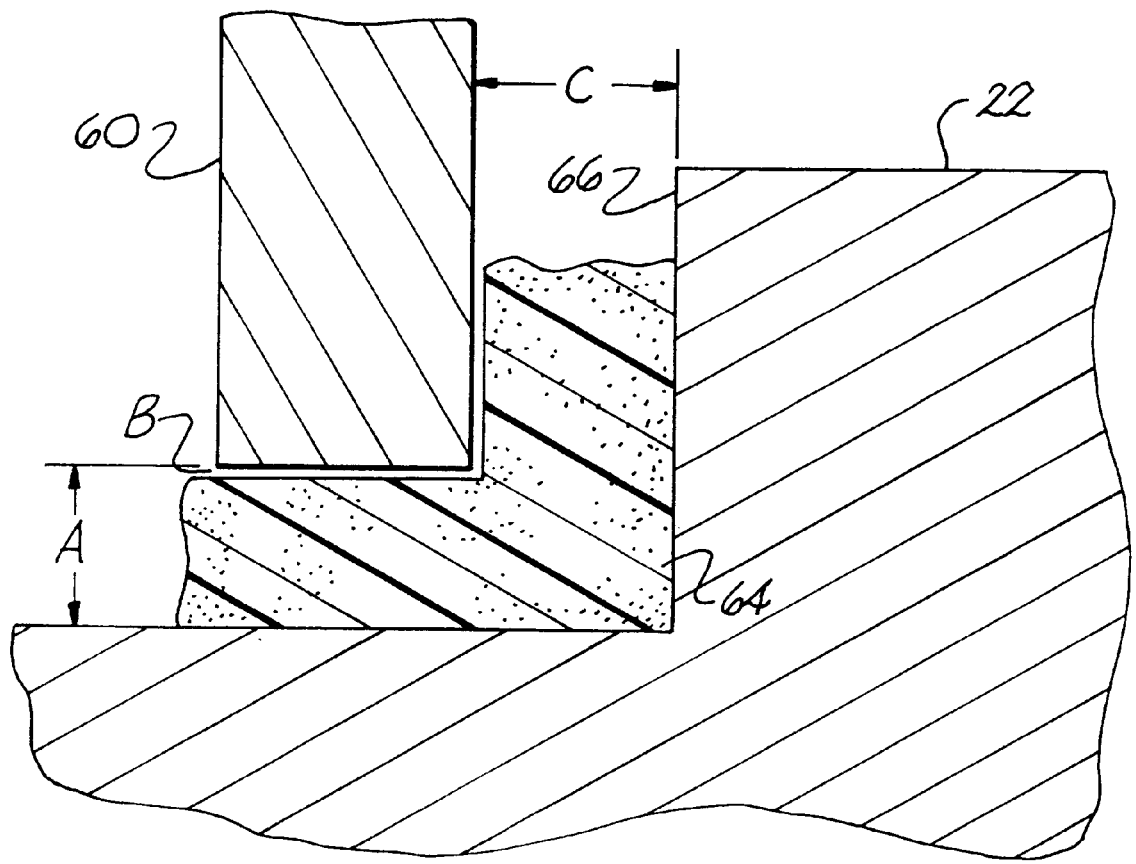
FIG. 4A is an enlarged cross-sectional view of the annular bead member of the seal assembly in relation to adjacent elements.

As can be seen most clearly in FIG. 4A, plate 60 is configured such that the inner surface of the hole through which hub 22 extends is separated from the hub's outer surface by a relatively small gap A. An annular bead member 64 extends across this gap to prevent ingress of particulate matter.

In this case, annular bead member 64 is attached to output hub 22 and thus rotates with respect to plate 60. As indicated at B, a minuscule clearance is provided between annular bead member 64 and plate 60 to permit this relative rotation. In other embodiments, annular bead member 62 may be attached to plate 60.

In the illustrated embodiment, hub 22 defines a stepped portion at the location where annular bead member 64 is situated, providing a side face 66 opposing a side face of plate 60. Annular bead member 64 preferably also extends into the gap C thus defined.

Annular bead member 64 is constructed of polymeric sealant material set in place from a viscous state about hub 22. For example, annular bead member 64 may be formed from silicone sealant compound in many exemplary embodiments. An RTV silicone is believed suitable for this purpose.

A preferred manner for forming seal assembly 58 will now be described with reference to FIG. 5. With plate 60 removed from the reducer housing, a bead 68 of polymeric sealant compound is applied to the outer surface of hub 22 in a viscous state. Due to the manner in which it is formed, bead 68 will conform to any irregularities in the hub's outer surface.

Preferably, bead 68 is applied in the "corner" at the base of side face 66 where hub 22 is stepped to a lesser diameter. As indicated at 70, a preselected release agent, such as a suitable machine oil, is applied to the large hole defined in plate 60. Plate 60 can then be attached to the reducer housing utilizing screws 62.

Although plate 60 will deform bead 68, the oil will provide a clearance as bead 68 is set in place. In other words, bead 68 will be fixed with respect to hub 22, but will not stick to plate 60. The minuscule clearance between bead 68 and plate 60 will function to prevent ingress of even very small particulate matter.

In presently preferred embodiments, an additional gasket 72 of the polymeric sealant compound is provided between the inside face of plate 60 and the region on the reducer housing to which it is attached. This gasket provides sealing between plate 60 and the reducer housing without the need for precision machining.

Although bead 68 and gasket 72 are shown being applied by respective tubes 74 and 76, it should be appreciated that this illustration is merely diagrammatic in nature. In a production situation, bead 68 and gasket 72 may be applied using air pressure techniques. Similarly, oil will typically be applied to plate 60 utilizing suitable industrial techniques instead of an oil can 78 as diagrammatically illustrated.

After plate 60 has been attached to the reducer housing, various other components located axially outboard thereof, such as bushing 34 and backing plate 42, may also be attached. As a particular advantage, seal assembly 58 is mounted entirely within the bushings and other components utilized to secure hub 22 to shaft 12. As a result, seal assembly 58 does not add to the overall size of speed reducer 10. This is especially desirable in environments where space is at a premium and the length of shaft 12 cannot be increased.

It should be appreciated that a seal assembly such as seal assembly 58 would also be provided at the other side of hub 22 axially inboard of bushing 32. A similar seal assembly could also be located about input shaft 14. In addition, the present invention is not limited to speed reducers, but applies generally to mechanical devices where it is desirable to provide a seal about a rotating member.

Thus, while preferred embodiments of the invention and preferred methods of practicing same have been shown and described, modifications and variations may be made thereto by those of ordinary skill in the art without departing from the spirit and scope of the present invention, which is more particularly set forth in the appended claims. In addition, it should be understood that aspects of the various exemplary constructions may be interchanged both in whole or in part. Furthermore, those of ordinary skill in the art will appreciate that the foregoing is by way of example only, and is not intended to be limitative of the invention so further described in such appended claims.

What is claimed is:

1. A speed reducer apparatus comprising:

a housing;

an input shaft extending from said housing for connection to a source of power;

an output member having a generally cylindrical outer surface defining a stepped portion having a first side surface, said output member rotatably driven by rotation of said input shaft; and a seal assembly including:

(a) a plate defining a hole through which said output member extends, said hole defining a first gap between an inner surface of said plate and said outer surface of said output member, said plate having a second side surface opposing said first side surface of said stepped portion of said output member to define a second gap; and (b) an annular bead member of polymeric sealant material about said output member, said bead member extending radially between an inner surface of said hole and said output member to provide a clearance while permitting relative rotation between said plate and said output member, said annular bead member further extending into said second gap.

2. A speed reducer as set forth in claim 1, wherein said output member comprises a hub defining an axial bore therethrough.

3. A speed reducer as set forth in claim 1, wherein said annular bead member is fixed with respect to one of said plate and said output member.

4. A speed reducer as set forth in claim 3, wherein said annular bead member is fixed with respect to said output member, said plate being rotatable with respect to said annular bead member.

5. A speed reducer as set forth in claim 3, wherein said polymeric sealant material comprises a silicone sealant compound.

6. A speed reducer as set forth in claim 1, further comprising a primary seal located axially internal of said seal assembly.

7. A speed reducer as set forth in claim 6, wherein said primary seal is a land riding seal.

8. A speed reducer as set forth in claim 1, wherein said plate is attached to said housing in a manner to be physically separable therefrom.

9. A mechanical apparatus comprising:
a bearing assembly having first and second race members capable of relative rotation;
a structure supporting said bearing assembly, said first race member of said bearing assembly being fixed with respect to said structure;
an axial member supported by said bearing assembly and rotatable with said second race member, said axial member having a generally cylindrical outer surface;
a seal plate attached to said structure in a manner to be physically separable therefrom and defining a hole through which said axial member extends, said hole defining a first gap between an inner surface of said plate and said outer surface of said axial member; and
an annular bead member of polymeric sealant material set in place from a viscous state about said axial member, said bead member extending across said first gap while providing a clearance to permit relative rotation between said plate and said axial member.

10. A mechanical apparatus as set forth in claim 9, wherein said annular bead member is fixed with respect to one of said plate and said axial member.

11. A mechanical apparatus as set forth in claim 10, wherein said annular bead member is fixed with respect to said axial member, said plate being rotatable with respect to the annular bead member.

12. A mechanical apparatus as set forth in claim 9, wherein said polymeric sealant material comprises a silicone sealant compound.

13. A mechanical apparatus as set forth in claim 9, wherein said plate is attached to said structure by screws.

14. A mechanical apparatus as set forth in claim 13, further comprising a polymeric gasket located between said structure and said plate.

15. A mechanical apparatus comprising:
a bearing assembly having first and second race members capable of relative rotation;
a structure supporting said bearing assembly, said first race member of said bearing assembly being fixed with respect to said structure;
an axial member supported by said bearing assembly and rotatable with said second race member, said axial member having a generally cylindrical outer surface;
a plate connected to said structure and defining a hole through which said axial member extends, said hole defining a first gap between an inner surface of said plate and said outer surface of said axial member;
an annular bead member of polymeric sealant material set in place from a viscous state about said axial member, said bead member extending across said first gap while permitting relative rotation between said plate and said axial member; and
wherein said axial member defines a stepped portion having a first side surface opposing a second side surface of said plate and defining a second gap therebetween, said annular bead member further extending into said second gap.

16. A mechanical apparatus as set forth in claim 15, wherein said axial member comprises a hub defining an axial bore therethrough.

17. A mechanical apparatus comprising:
a bearing assembly having first and second race members capable of relative rotation:
a structure supporting said bearing assembly, said first race member of said bearing assembly being fixed with respect to said structure;
an axial member supported by said bearing assembly and rotatable with said second race member, said axial member having a generally cylindrical outer surface;
a plate connected to said structure and defining a hole through which said axial member extends, said hole defining a first gap between an inner surface of said plate and said outer surface of said axial member;
an annular bead member of polymeric sealant material set in place from a viscous state about said axial member, said bead member extending across said first gap while permitting relative rotation between said plate and said axial member; and
a primary seal located axially adjacent to said plate.

18. A mechanical apparatus as set forth in claim 7, wherein said primary seal is a land riding seal.

19. A method of providing a seal about a rotatable member being supported from a housing structure, said method comprising steps of:
(a) providing an element defining therein a hole having a selected inner diameter greater than an outer diameter of said rotatable member;
(b) providing said housing structure such that said element can be separably mounted thereon with said hole about said rotatable member to define a gap therebetween;
(c) applying an annular bead of polymeric sealant material in a viscous state to one of said element and said rotatable member when said element is separated from said housing structure;
(d) applying a release agent to another of said element and said rotatable member when said element is separated from said housing structure;
(e) mounting said element to said housing structure before said polymeric sealant material sets from said viscous state such that said polymeric sealant material extends across said gap; and (f) allowing said polymeric sealant material to set, thereby forming an annular bead member.

20. A method as set forth in claim 19, wherein said rotating member comprises a hub defining an axial bore therethrough.

21. A method as set forth in claim wherein 20, wherein said hub defines a stepped portion on an outer surface thereof located to be axially adjacent to said element when said element is mounted to said housing structure, said polymeric sealant material being applied in step (c) to said rotating member into a corner defined by said stepped portion.

22. A method as set forth in claim 19, wherein said polymeric sealant material is applied in step (c) to said rotatable member and said release agent is applied in step (d) to said element.

23. A method as set forth in claim 21, wherein said polymeric sealant material comprises a silicone sealant compound.

24. A method as set forth in claim 21, wherein said release agent comprises a lubricating oil.

25. A method as set forth in claim 19, wherein said element is mounted in step (e) utilizing screws, said screws applying a force to manipulate said annular bead to form said annular bead member as a seal.

\* \* \* \* \*